US008937925B2

(12) United States Patent
Hayashi

(10) Patent No.: US 8,937,925 B2
(45) Date of Patent: *Jan. 20, 2015

(54) MOBILE COMMUNICATION SYSTEM, CORE NETWORK NODE SELECTION METHOD, AND BASE STATION AND MOBILE STATION USED THEREFOR

(75) Inventor: Sadafuku Hayashi, Tokyo (JP)

(73) Assignee: Lenovo Innovations Limited (Hong Kong), Quarry Bay (HK)

( * ) Notice: Subject to any disclaimer, the term of this patent is extended or adjusted under 35 U.S.C. 154(b) by 0 days.

This patent is subject to a terminal disclaimer.

(21) Appl. No.: 13/558,447

(22) Filed: Jul. 26, 2012

(65) Prior Publication Data

US 2012/0287908 A1 Nov. 15, 2012

Related U.S. Application Data

(62) Division of application No. 13/303,354, filed on Nov. 23, 2011, which is a division of application No. 11/829,644, filed on Jul. 27, 2007, now Pat. No. 8,213,381.

(30) Foreign Application Priority Data

Aug. 23, 2006 (JP) ................................. 2006-225967

(51) Int. Cl.
| | |
|---|---|
| H04W 4/00 | (2009.01) |
| H04W 36/00 | (2009.01) |
| H04L 12/28 | (2006.01) |
| H04W 36/12 | (2009.01) |
| H04W 92/20 | (2009.01) |

(52) U.S. Cl.
CPC .......... *H04W 36/12* (2013.01); *H04W 36/0016* (2013.01); *H04W 36/0033* (2013.01); *H04W 92/20* (2013.01)
USPC ........ 370/331; 370/328; 370/389; 455/432.1; 455/436

(58) Field of Classification Search
USPC ......... 370/331–333, 389, 392, 400, 401, 328, 370/352; 455/432.1, 432.2, 436
See application file for complete search history.

(56) References Cited

U.S. PATENT DOCUMENTS 6,947,399 B1 * 9/2005 Sen et al. ...................... 370/331
7,089,017 B2   8/2006 Chen et al.

(Continued)

FOREIGN PATENT DOCUMENTS

| CN | 1689366 A | 10/2005 |
|---|---|---|
| JP | 2004-297205 A | 10/2004 |

(Continued)

OTHER PUBLICATIONS

3GPP TSG-RAN WG3 Meeting #50, R3-060012; Key Issue Optimized MM, Jan. 12, 2006.

(Continued)

*Primary Examiner* — Hassan Phillips
*Assistant Examiner* — Saba Tsegaye
(74) *Attorney, Agent, or Firm* — Sughrue Mion, PLLC

(57) ABSTRACT

A mobile communication system in which a plurality of base stations and a plurality of core network nodes are distributed in a plurality of areas, wherein a source base station or a mobile station in a handover procedure of the mobile station transmits information for selecting a core network node to a target base station.

11 Claims, 7 Drawing Sheets

(56) References Cited

U.S. PATENT DOCUMENTS

| | | | |
|---|---|---|---|
| 2002/0072363 | A1 | 6/2002 | Riihinen et al. |
| 2002/0123348 | A1 | 9/2002 | Willars et al. |
| 2002/0191556 | A1* | 12/2002 | Krishnarajah et al. ........ 370/329 |
| 2004/0010609 | A1 | 1/2004 | Vilander et al. |
| 2004/0017798 | A1 | 1/2004 | Hurtta et al. |
| 2004/0053632 | A1 | 3/2004 | Nikkelen et al. |
| 2004/0203736 | A1 | 10/2004 | Serna |
| 2005/0239465 | A1 | 10/2005 | Lee et al. |
| 2005/0272481 | A1* | 12/2005 | Kim .............................. 455/574 |
| 2006/0068789 | A1 | 3/2006 | Vannithamby et al. |
| 2006/0072506 | A1* | 4/2006 | Sayeedi et al. ................ 370/331 |
| 2006/0142003 | A1 | 6/2006 | Ahmavaara |
| 2006/0172741 | A1 | 8/2006 | Jeong et al. |
| 2006/0176872 | A1 | 8/2006 | Serna et al. |
| 2006/0199590 | A1* | 9/2006 | Park .............................. 455/445 |
| 2007/0041346 | A1 | 2/2007 | Bae et al. |
| 2007/0254667 | A1 | 11/2007 | Jokinen |
| 2007/0291699 | A1 | 12/2007 | Lee et al. |

FOREIGN PATENT DOCUMENTS

| | | |
|---|---|---|
| KR | 2001-0108453 A | 12/2001 |
| WO | 03/103325 A1 | 12/2003 |
| WO | 2005/029785 A1 | 3/2005 |
| WO | 2005-089216 A2 | 9/2005 |

OTHER PUBLICATIONS

3GPP TSG-RAN WG2 #53bis, R2-061972; Connection re-establishment, Jun. 30, 2006.

3GPP TR25.813 V7.0.0(Jun. 2006); 3rd Generation Partnership Project; Technical Specification Group Radio Access Network; Evolved Universal Terrestrial Radio Access (E-UTRA( and Evolved Univeral Terrestrial Radio Access Network (E-UTRAN); Radio interface protocol aspects (Release 7).

Extended European Search Report mailed Jul. 6, 2012 for corresponding European application No. 07114752.4.

Office Action dated May 19, 2011 from the Patent Office of the People's Republic of China in counterpart Chinese application No. 200710146137.8.

3rd Generation Partnership Project, Technical Specification Group Services and Systems Aspects, Intra-domain connection of Radio Access Network (RAN) nodes to multiple Core Network (N) nodes (Release 6) 3GPP TS23.236 V6.3.0 (Mar. 2006).

Office Action, dated Jul. 16, 2013, issued by the Japanese Patent Office in counterpart Japanese Patent Application No. 2012-042628.

Huawei, "Consideration on Security, Counter Check Procedure for LTE System," 3GPP TSG-RAN WG2 #52, Tdoc R2-060863, Mar. 27-31, 2006, 6 pages.

Office Action, dated Nov. 5, 2013, issued by the State Intellectual Property Office of the People's Republic of China, in counterpart Application No. 201110375084.3.

3GPP TSG SA WG2 Architecture—SA2#53, S2-062262, Discussion on signalling with a separated MME.

3GPP TSG SA WG2 Architecture—SA2#53, S2-062263, Inter MME/UPE mobility in active mode.

Office Action, dated Apr. 16, 2014, issued by the United States Patent and Trademark Office, in counterpart U.S. Appl. No. 13/303,354.

3GPP TSG-RAN WG3 Meeting #50, R3-060012; Key Issue Optimized MM, Jan. 2006.

3GPP TSG-RAN WG2 #53bis, R2-061972; Connection re-establishment, Jun. 2006.

3GPP TSG SA WG2 Architecture—SA2#53, S2-062262, Discussion on signalling with a separated MME, Jun. 2006.

3GPP TSG SA WG2 Architecture—SA2#53, S2-062263, Inter MME/UPE mobility in active mode, Jun. 2006.

* cited by examiner

MOBILE COMMUNICATION SYSTEM, CORE NETWORK NODE SELECTION METHOD, AND BASE STATION AND MOBILE STATION USED THEREFOR

CROSS-REFERENCE TO RELATED APPLICATION

This application is a divisional of U.S. patent application Ser. No. 13/303,354 filed Nov. 23, 2011, which is a divisional of U.S. patent application Ser. No. 11/829,644 filed Jul. 27, 2007, now U.S. Pat. No. 8,213,338, which is based upon and claims the benefit of priority from Japanese Patent Application No. 2006-225967 filed on Aug. 23, 2006, the contents of all of which are incorporated herein by reference in their entirety.

BACKGROUND OF THE INVENTION

1. Field of the Invention

The present invention relates to a mobile communication system, a core network node selection method, and a base station and a mobile station used therefor, and more particularly, to a method for selecting a core network node at the time of a handover associated with the movement of a mobile station.

2. Description of Related Art

A mobile communication system based on Long Term Evolution (LTE) of 3GPP aims at such architecture as shown in FIG. 8. This architecture is intended to build a system that can realize data transfer of higher throughput, for example, than existing systems by reducing transmission delay in a control plane and a user plane.

In this architecture, when cells of base stations (eNodes B 21 to 23) are small, e.g., in a metropolitan area, it is possible that movement of a mobile station (User Equipment or UE) between base stations significantly increases handover signals transmitted from a base station to a core network node (CN Node 11 or 12, hereinafter abbreviated as CN node). Consequently, excess signal load would be placed on a Core Network (CN). To reduce load of handover signals on the CN node, direct exchange of handover signals between a source base station (Source eNode B) and a target base station (Target eNode B) is under consideration.

Also, as shown in the sequence diagram of FIG. 9 that shows operations during a handover, when a mobile station moves from a cell covered by a source base station to a cell covered by a target base station and the source base station carries out a handover (S1), if a handover is successful by using a handover signal ("Handover Request" message) S2 which the target base station receives from the source base station, that is, if the target base station establishes a communication connection with the mobile station (S3 to S7), the handover procedure can be completed just by the target base station transmitting one signal S8 called "Handover Complete" to a CN node.

The signal name "Handover Complete" is just an example: the signal is also called "Path Switch", "Binding Update" etc., all of which are supposed to mean the same signal.

Upon receipt of the "Handover Complete" signal, the CN node switches the path for the mobile station from the source base station to the target base station. In this way, the loads of signals and processing on CN nodes due to a handover can be reduced.

Describing this further in detail with reference to FIG. 9, S9 denotes a process for the CN node 11 having received the "Handover Complete" signal S8 to switch the path for the mobile station from the source base station to the target base station. After this process, the CN node 11 transmits "Handover Complete Ack (Acknowledge)" signal S10 to the target base station. Upon receiving the signal S10, the target base station transmits "Release Resource" signal S11 to the source base station, and in response to the signal S11, the source base station releases a radio resource allocated for the UE. The release of resource is notified to the CN node 11 with "Release Resource Indication" signal S12 to complete the handover process. In this manner, loads of signals and processing on CN nodes due to a handover can be reduced.

In a hierarchical structure of CN nodes and base stations, to prevent service unavailability in a wide area covered by one CN node in a core network due to its system failure, for example, such a configuration has been proposed in which CN nodes 11, and eNode Bs 21 to 23, which are base stations, are connected with one another in a mesh configuration so that even if one of the CN nodes fails, the other CN node replaces it to continue to provide services, as shown in FIG. 8. This mesh configuration is called "S1-Flex", which is known from 3GPP TR 23.236 V6. 3.0 (2006-03) (Non-Patent Document 1). The "S1" denotes S1 interface which is an interface between CN nodes and base stations (eNode B), and "S1-Flex" used to be called "Iu-Flex" in mobile communication systems prior to the LTE system.

In the LTE-based mobile communication system having the S1-Flex configuration, once a mobile station is connected to a CN node, it is basically desirable not to change the CN node as long as the communication continues. This is because it is possible to reduce interruption of communication due to a handover by minimizing handovers between CN nodes that are performed along with the movement of the mobile station, and also because maintaining a communication path for a long time period is desirable for a non-real-time service communication such as data communication.

Existing systems have the soft handover function, which can prevent discontinuity or interruption of audio even when the mobile station moves between base stations. However, the new LTE system mentioned above is designed to build architecture without soft handover because the system is complicated by maintaining the soft handover function.

The new LTE system also aims at the effect of reducing signal load on CN nodes by reducing handovers between CN nodes so that fewer signals are exchanged between CN nodes when a mobile station moves.

However, in the S1-Flex configuration shown in FIG. 8, it is sometimes impractical not to change the CN node with which a mobile station should communicate when the mobile station moves. This is because, by way of example, if a mobile station as a user terminal starts communication in Tokyo and continues to be connected to a CN node in Tokyo even after its user travels to Osaka by Shinkansen, the communication path gets long and transmission delay will significantly increase. In such a case, it is therefore required to change the CN node as the mobile station moves. Consequently, the function to change or not to change a CN node as appropriate when a mobile station moves is required for the S1-Flex configuration.

However, at present, there is no means or way for a target base station to select a CN node at the time of a handover in the LTE system. In the existing system, a CN node receives a handover request signal from a source RNC (radio network controller) and the CN node itself can judge whether to change the CN node.

SUMMARY

An exemplary object of the invention is to provide a mobile communication system and a CN node selection method that enable a target base station to select an appropriate CN node when a mobile station moves, as well as a base station and a mobile station used for the same.

A base station according to an exemplary aspect of the invention is a source base station in a mobile communication system in which a plurality of base stations and a plurality of core network nodes are distributed in a plurality of areas, the source base station including:

a wireless communication unit that performs wireless communication with a mobile station that performs handover from the source base station to a target base station in a handover procedure; and a communication unit that transmits, to the target base station, a first identifier of a core network node to which the source base station is connected and a second identifier of an area to which the source base station belongs, in the handover procedure.

A base station according to an exemplary aspect of the invention is a target base station in a mobile communication system in which a plurality of base stations and a plurality of core network nodes are distributed in a plurality of areas, the target base station including:

a wireless communication unit that performs wireless communication with a mobile station that performs handover from a source base station to the target base station in a handover procedure;

a communication unit that receives, from the source base station, a first identifier of a core network node to which the source base station is connected and a second identifier of an area to which the source base station belongs, in the handover procedure.

A system according to an exemplary aspect of the invention is a mobile communication system in which a plurality of base stations and a plurality of core network nodes are distributed in a plurality of areas, the mobile communication system including;

a mobile station; a source base station; and a target base station, wherein the mobile station that performs handover from the source base station to the target base station in a handover procedure;

the source base station that transmits a first identifier of a core network node to which the source base station is connected and a second identifier of an area to which the source base station belongs, in the handover procedure; and the target base station that receives the first identifier and the second identifier from the source base station.

A method according to an exemplary aspect of the invention is a method for a mobile communication system in which a plurality of base stations and a plurality of core network nodes are distributed in a plurality of areas, the method including:

in a source base station, performing wireless communication with a mobile station that performs handover from the source base station to a target base station in a handover procedure; and in the source base station, transmitting, to the target base station, a first identifier of a core network node to which the source base station is connected and a second identifier of an area to which the source base station belongs, in the handover procedure.

A mobile station according to an exemplary aspect of the invention is a mobile station in a mobile communication system in which a plurality of base stations and a plurality of core network nodes are distributed in a plurality of areas, the mobile station including:

a handover processing unit that performs handover from a source base station to a target base station in a handover procedure;

a wireless communication unit that performs wireless communication with the source base station and the target base station; and a communication unit that transmits, to the target base station, an identifier of a core network node to which a source base station is connected and an identifier of an area to which the source base station belongs, in the handover procedure.

A base station according to an exemplary aspect of the invention is a target base station in a mobile communication system in which a plurality of base stations and a plurality of core network nodes are distributed in a plurality of areas, the target base station including:

a wireless communication unit that performs wireless communication with a mobile station that performs handover from a source base station to the target base station in a handover procedure;

the communication unit that receives, from a mobile station, a first identifier of a core network node to which the source base station is connected and a second identifier of an area to which the source base station belongs, in the handover procedure.

A system according to an exemplary aspect of the invention is a mobile communication system in which a plurality of base stations and a plurality of core network nodes are distributed in a plurality of areas, the mobile communication system including:

a source base station;

a target base station; and a mobile base station that performs handover from the source base station to the target base station in a handover procedure and transmits, to the target base station, a first identifier of a core network node to which a source base station is connected and a second identifier of an area to which the source base station belongs, in the handover procedure.

A method according to an exemplary aspect of the invention is a method for a mobile communication system in which a plurality of base stations and a plurality of core network nodes are distributed in a plurality of areas, the method including:

in a mobile station, performing handover from a source base station to a target base station in a handover procedure; and in the mobile station, transmitting, to the target base station, a first identifier of a core network node to which the source base station is connected and a second identifier of an area to which the source base station belongs, in the handover procedure.

A system according to an exemplary aspect of the invention is a mobile communication system in which a plurality of base stations and a plurality of core network nodes are distributed in a plurality of areas, wherein a target base station in a handover procedure of a mobile station selects a core network node to which the target base station connects based on information for selecting a core network node transmitted from a source base station or a mobile station.

A system according to an exemplary aspect of the invention is a mobile communication system in which a plurality of base stations and a plurality of core network nodes are distributed in a plurality of areas, wherein a source base station or a mobile station in a handover procedure of the mobile station transmits information for selecting a core network node to a target base station.

A base station according to an exemplary aspect of the invention is a source base station in a mobile communication system including a target base station and a mobile station, the source base station including:

a wireless communication unit that performs wireless communication with the mobile station that performs handover from the source base station to the target base station in a handover procedure; and a communication unit that transmits an identifier of a core network node to which the source base station is connected to the target base station in the handover procedure.

A system according to an exemplary aspect of the invention is a mobile communication system including a source base station, a target base station and a mobile station, wherein the mobile station performs handover from the source base station to the target base station in a handover procedure, the source base station performs wireless communication with the mobile station and transmits an identifier of a core network node to which the source base station is connected to the target base station in the handover procedure, and the target base station receives the identifier of the core network.

A method according to an exemplary aspect of the invention is a method for a communication system, the system including a source base station, a target base station and a mobile station, the method including:

performing, in the source base station, wireless communication with the mobiles station that performs handover from the source base station to the target base station in a handover procedure; and transmitting, in the source base station, an identifier of a core network node to which the source base station is connected, to the target base station in the handover procedure.

EXEMPLARY EMBODIMENT

Figure 1:
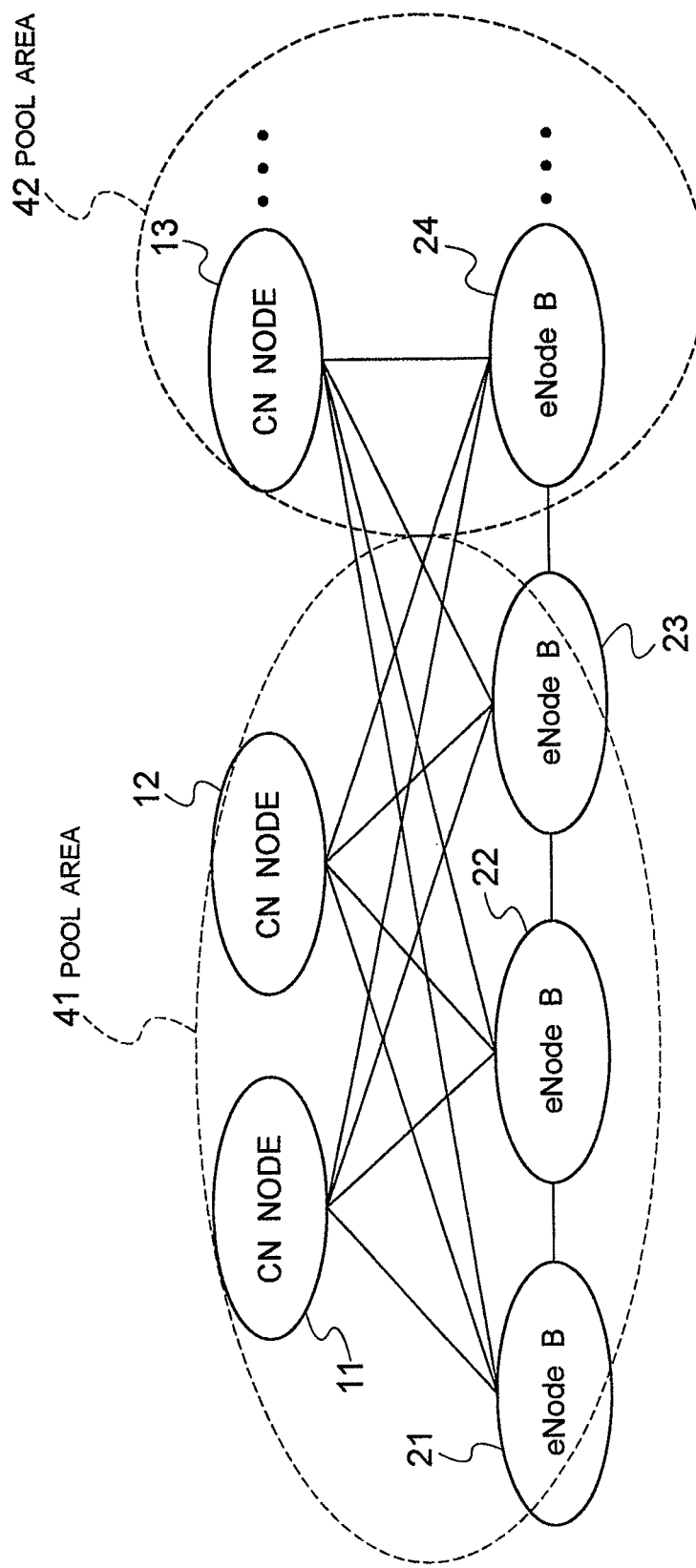
FIG. 1 is a system diagram showing a configuration of pool areas to which the exemplary embodiments of the invention are applied.
Figure 8:
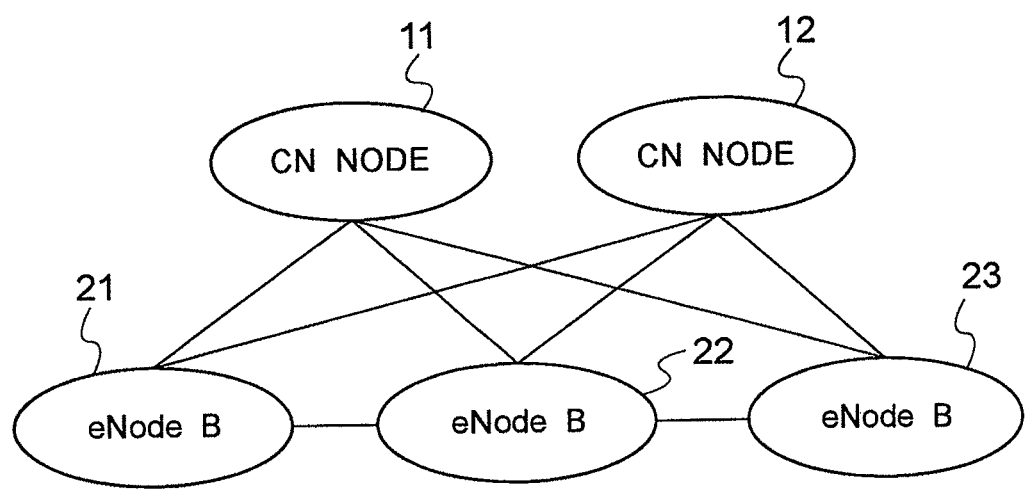
FIG. 8 illustrates the existing S1-Flex configuration among eNode Bs and CN nodes.

The present invention will be described below with reference to drawings. FIG. 1 is a system configuration diagram for illustrating the principle of the exemplary embodiments of the invention, showing an example of a mobile communication system that uses the concept of "Pool Area" which is defined in the Non-patent Document 1. In FIG. 1, components corresponding to the ones shown in FIG. 8 are denoted with the same reference numerals as in FIG. 8.

A CN is responsible for call control, location control, service control and the like, and sometimes collectively refers to an Access Gateway (ASGW) and/or an Access Anchor. CN nodes 11 to 13 are nodes constituting a Core Network (CN). The CN nodes may be nodes having known functions, such as MSC (Mobile Switching Center), SGSN (Serving GPRS (General Packet Radio Service) Support Node) and HLR (Home Location Register). A "CN" sometimes refers to a CN node itself.

A certain area covered by the CN nodes 11 to 13 and base stations 21 to 24 is segmented into pool areas 41 and 42, each of which has assigned thereto a pool area ID for identifying the area. It is assumed that the pool areas 41 and 42 are defined in advance by an operator. Each of the CN nodes 11 to 13 and base stations 21 to 24 has a pool area ID of the pool area to which it belongs. To each of the CN nodes, a CN node ID is assigned, and to each of the base stations, a base station ID is assigned.

In FIG. 1, in the pool area 41, the CN nodes 11 and 12, and the base stations 21 to 23 are located, and in the pool area 42, the CN node 13 and the base station 24 are located. It is assumed that a mobile station not shown is now in communication with the base station 21 and the base station 21 is being connected to and communicating with the CN node 11. In this situation, when the mobile station moves to a cell of the base station 22, the base station 22 remains to be connected to the CN node 11 and does not change the CN node for connection because the base station 22 is still able to connect to the CN node 11.

It is assumed that the mobile station moves from the base station 22 to the base station 23 while still in communication. At this time, since the distance between the base station 23 and the CN node is still short enough not to affect delay in communication, the base station 23 remains to be connected to the CN node 11 and does not change the CN node for connection.

It is assumed that the mobile station further moves from the base station 23 to the base station while in communication. Then, the distance between the target base station 24 and the CN node 11 in the pool area 41 becomes long enough to affect delay in communication, so that the target base station 24 determines whether to change the CN node in accordance with the type of communication performed by the mobile station. If the communication is of a type that is not sensitive to delay, e.g., a non-real-time service (NRT) type, the base station 24 continues to communicate with the CN node 11.

However, if the communication performed by the mobile station is of a real-time (RT) service type that is sensitive to delay, the base station 24 selects the CN node 13 belonging to the pool area 42, to which the base station 24 belongs, as a CN node for communication (connection), and continues communication. Here, the non-real-time service may be data communication, for example, and the real-time service may be audio communication and/or streaming, for instance.

Figure 2:
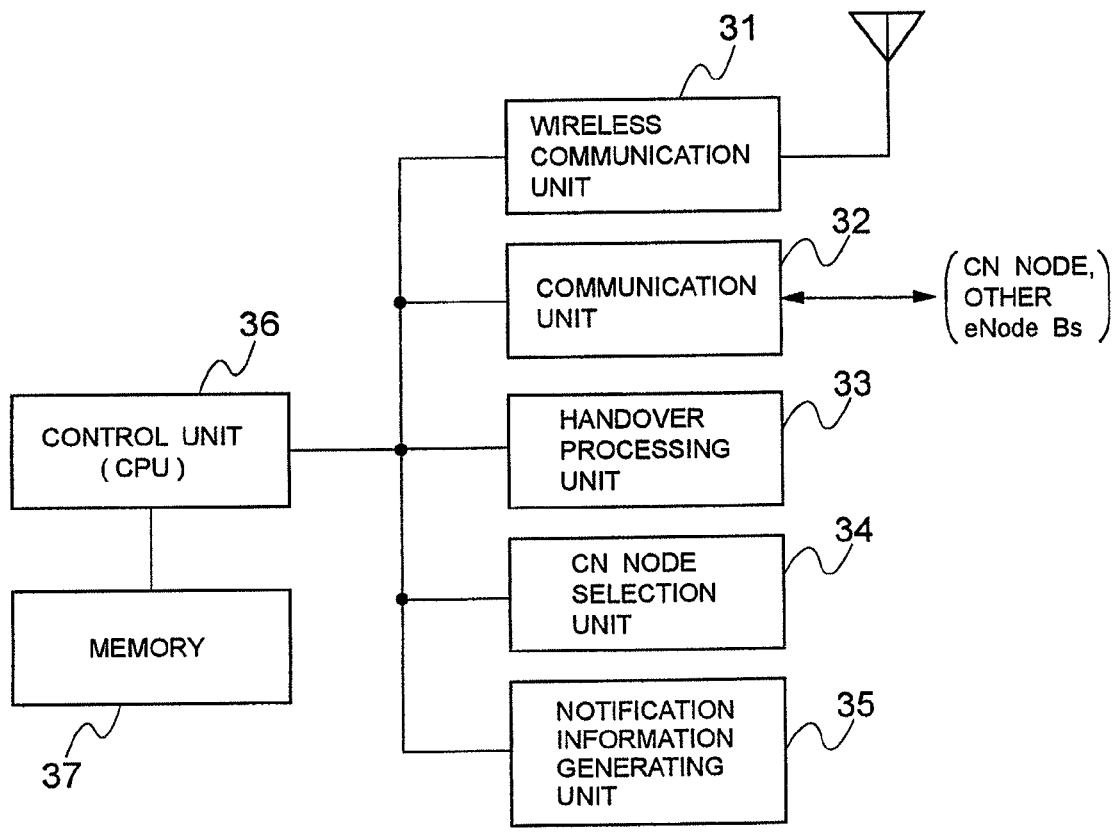
FIG. 2 is a functional block diagram of a base station according to a first exemplary embodiment of the invention.

Based on the principle described above, a first exemplary embodiment of the invention can be provided as follows. FIG. 2 is a functional block diagram of a base station according to the first exemplary embodiment of the invention. The base station according to the first exemplary embodiment of the invention includes a wireless communication unit 31, a communication unit 32, a handover processing unit 33, a CN node selection unit 34, a notification information generating unit 35, a control unit (CPU) 36, and a memory 37.

The wireless communication unit 31 performs communication with mobile stations. The communication unit 32 performs communication with CN nodes and/or other base stations. The handover processing unit 33 performs handover processing. The CN node selection unit 34 selects a CN node for a mobile station to communicate with (or connect to) when the base station becomes a target base station at the time of a handover of the mobile station. The notification information generating unit 35 generates notification information for a target base station when the base station becomes a source base station at the time of a handover. The control unit (CPU) 36 controls the units 31 to 35. The memory 37 functions as work memory for the control unit 36 and also as ROM in which the control operations of the control unit 36 are prestored as a control procedure program.

Figure 3:
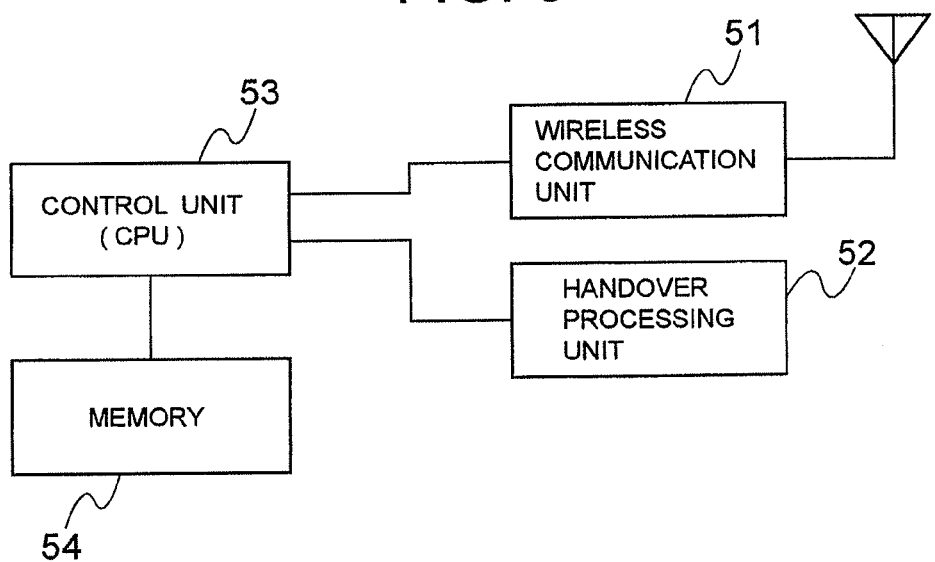
FIG. 3 is a functional block diagram of a mobile station according to a first exemplary embodiment of the invention.

FIG. 3 is a functional block diagram of a mobile station according to the first exemplary embodiment of the invention. The mobile station of the first exemplary embodiment of the invention includes a wireless communication unit 51, a handover processing unit 52, a control unit (CPU) 53, and a memory 54. The wireless communication unit 51 performs communication with a base station. The handover processing unit 52 performs handover processing. The control unit (CPU) 53 controls the units 51 and 52. The memory 54 functions as work memory for the control unit 53 and also as ROM in which the control operations of the control unit are prestored as a control procedure program.

Figure 4:
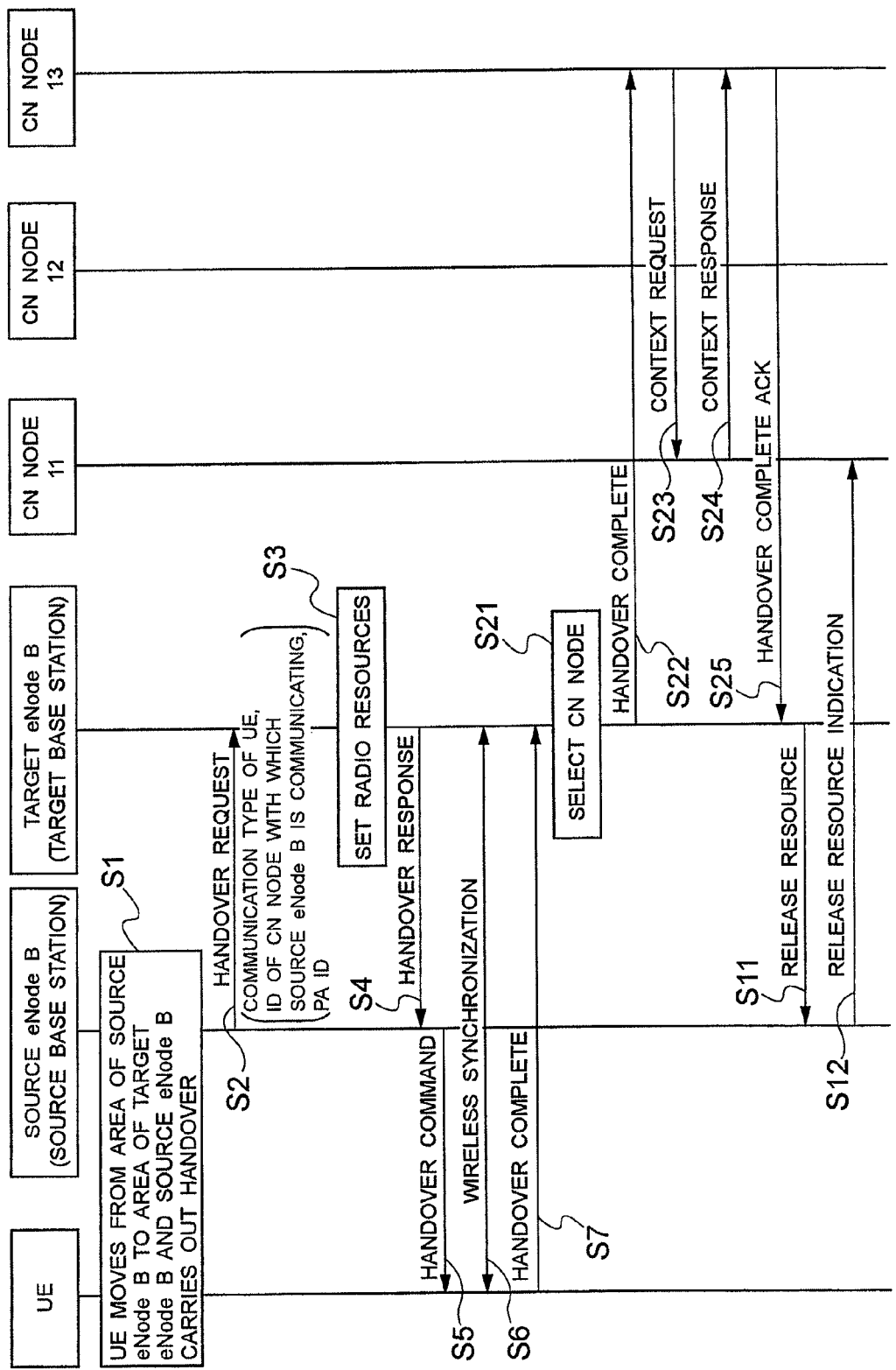
FIG. 4 is a sequence diagram showing operations in the first exemplary embodiment of the invention.
Figure 9:
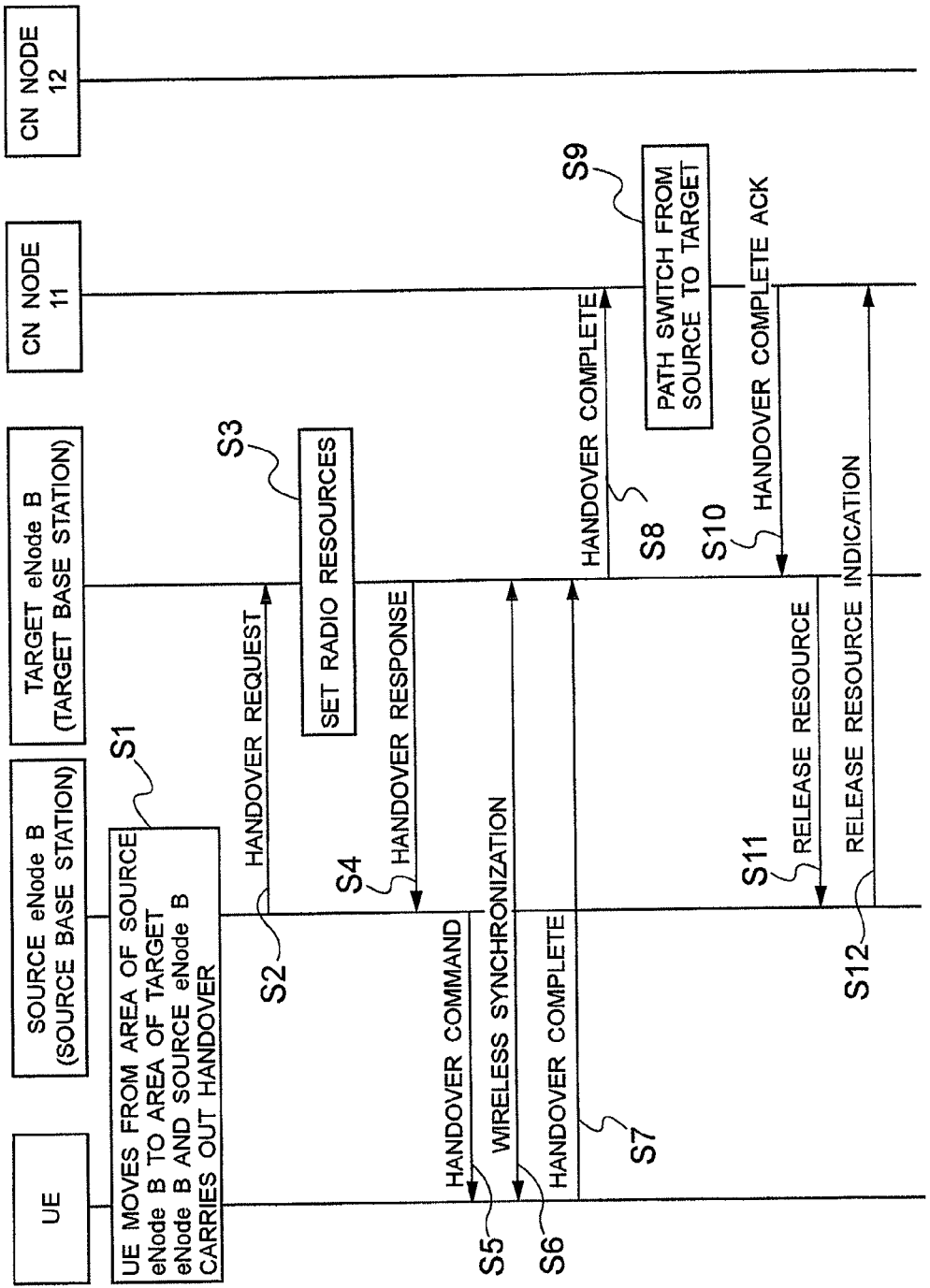
FIG. 9 is a sequence diagram showing an example of a handover procedure in the configuration of FIG. 8.

FIG. 4 is a sequence diagram showing operations in the first exemplary embodiment of the invention, wherein signals and processing corresponding to the ones shown in FIG. 9 are denoted with the same reference numerals as in FIG. 9. When the mobile station moves from a cell of a source base station to a cell of a target base station and the source base station performs a handover (S1), the source base station transmits "Handover Request" message S2 as a handover request signal to the target base station. The message S2 contains information for selecting a CN node, such as the type of communication performed by the mobile station, the ID of a CN node with which the source base station has been communicating, and the ID of a pool area (PA) to which the source base station belongs. The information for selecting a CN node is generated by the notification information generating unit 35 shown in FIG. 2.

Figure 5:
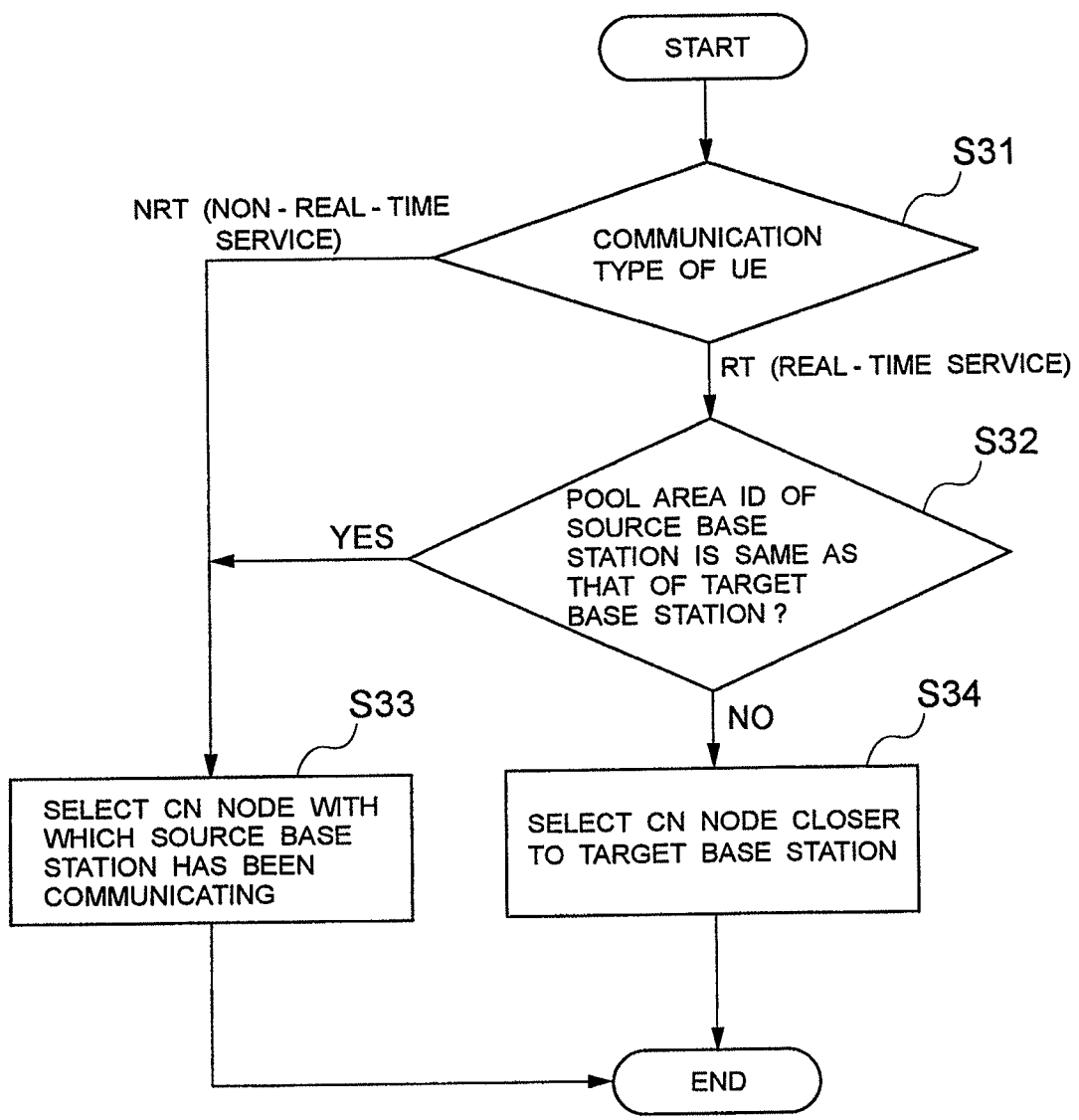
FIG. 5 is a flowchart illustrating the algorithm for selecting a CN node for communication executed at a target base station in the first exemplary embodiment of the invention.

After the handover succeeds and the target base station establishes a communication connection with the mobile station (S3 to S7), the target base station selects a CN node to which it should be connected in accordance with a CN node selection algorithm at the CN node selection unit 34 (see FIG. 2) (S21). The flowchart shown in FIG. 5 illustrates an example of this CN node selection algorithm. Referring to FIG. 5, the type of communication performed by the mobile station which will undergo a handover is first determined (step S31). Specifically, it is determined whether the communication type is a real-time service or a non-real-time service. This determination is made by using communication type information contained in the "Handover Request" signal S2.

If the communication type is a non-real-time service, the target base station selects the CN node with which the source base station has been communicating (been connected to), that is to say, does not change the CN node (step S33). In this case, subsequent processing will be the same as processing S8 to S12 of FIG. 9. On the other hand, if the communication type is a real-time service such as audio communication, it is determined whether the pool area ID of the source base station is the same as that of the target base station (step S32).

This determination is made with information on the ID of a pool area to which the source base station belongs that is contained in the "Handover Request" signal S2. If the pool area ID of the source base station is the same as that of the target base station (Yes at step S32), processing at step S33 is performed, that is, the CN node is not changed.

On the other hand, if the pool area ID of the source base station is different from that of the target base station, processing at step S34 is performed. In this processing, a CN node that is closer to the target base station than the CN node with which the source base station has been communicating (or connected to) (generally, a CN node within a pool area to which the target base station belongs) is selected as the node for connection. This can prevent information delay that results from a long communication path. Here, the target base station can also select a CN node that is closest to it. When selecting a CN node, the target base station may be configured to select one with reference to a table showing the positional relationship between the target base station and CN nodes which is prepared in each base station.

Referring back to FIG. 4, after step S34 of FIG. 5, the target base station transmits "Handover Complete" message S22 to the selected CN node. Assuming that the target base station is the base station 24 in the system of FIG. 1, the selected CN node is the CN node 13 within the same pool area 42. Therefore, the sequence of FIG. 4 shows that the signal S22 is transmitted to the CN node 13.

After the CN node 13 receives the "Handover Complete" message S22 from the target base station, the CN node 13 asks the source CN node (CN node 11 in this example) for information on the mobile station, that is, "UE Context" ("Context Request" signal S23), because the CN node 13 does not have control information for the mobile station. The target CN node 13 can get the destination of the "Context Request" signal S23 from the ID of the source CN node 11 contained in the "Handover Complete" message S22 received from the target base station. Then, the CN node 13 receives the "UE Context" information through "Context Response" signal S24 from the CN node 11, sets the target base station and a path, and continues communication (S25, S11, and S12).

The selection of a CN node at the target base station shown in FIG. 5 can be represented as the rules below:
If QoS=NRT (if Quality of Service (QoS) is a non-real-time service),
then, target eNode B chooses same CN Node.
If QoS=RT and PA=own PA (if the QoS is a real-time service and the pool area ID is the same as its own pool area ID),
then, target eNode B chooses same CN Node,
else,
if QoS=RT and PA≠own PA (if the QoS is a real-time service and the pool area ID is not the same as its own pool area ID),
then, target eNode B chooses target CN Node.

By selecting a CN node based on a communication type and a pool area, the first exemplary embodiment provides the effects of reducing the frequency of CN node switching and lessening the influence of information delay resulting from a long communication path on the quality of a service which is sensitive to delay, such as a real-time service.

The first exemplary embodiment described above focuses attention to delay of information resulting from a long communication path and determines whether the communication type is a real-time service (RT) or a non-real-time service (NRT), and changes the CN node if the communication type is a real-time service which is sensitive to delay and if the pool ID is different. Next, a second exemplary embodiment will be described below as illustration of a case that focuses on discontinuity (or interruption) of information due to CN node switching and controls CN node switching by determining whether the communication type is an audio communication service which is sensitive to discontinuity of information or a data communication service which tolerates discontinuity of information.

As the system configuration, and the configurations of a base station and a mobile station of the second exemplary embodiment are the same as those of the first exemplary embodiment, description of them is omitted. The operation sequence diagram of this exemplary embodiment is the same as the operation sequence of FIG. 4 except for the algorithm for CN node selection processing S21 at the target base station in FIG. 4.

Figure 6:
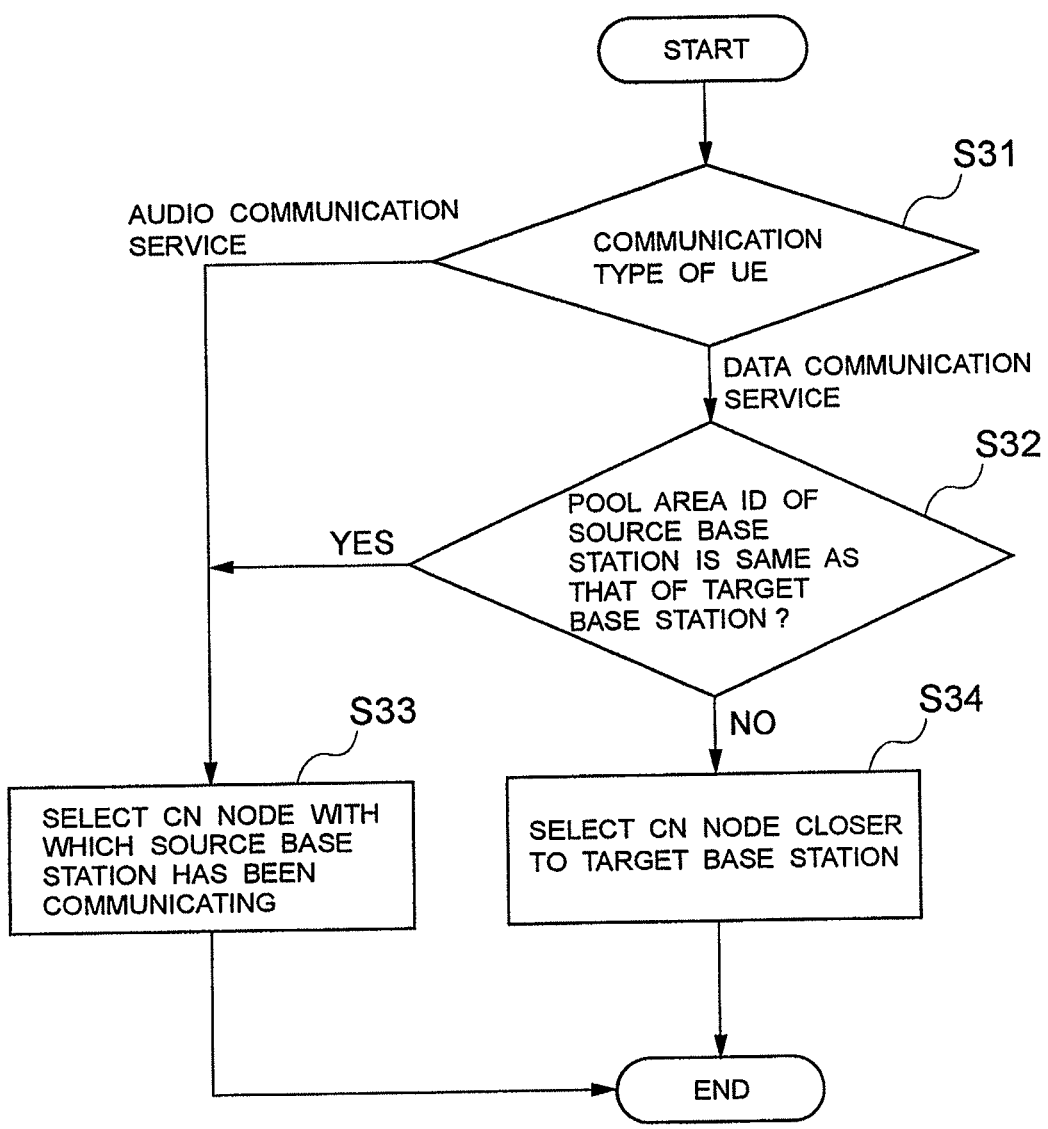
FIG. 6 is a flowchart illustrating the algorithm for selecting a CN node for communication executed at a target base station in the second exemplary embodiment of the invention.

FIG. 6 is a flowchart showing the CN node selection algorithm in this exemplary embodiment, wherein steps corresponding to the ones FIG. 5 are denoted with the same reference numerals as in FIG. 5. In FIG. 6, the type of communication performed by the mobile station which is to undergo a handover is determined (step S31). Specifically, at step S31, it is determined whether the communication type is an audio communication service which is sensitive to discontinuity of information or a data communication service which tolerates discontinuity of information.

If the communication type is an audio communication service, the target base station selects the CN node with which the source base station has been communicating, that is, does not change the CN node (step S33). This can prevent discontinuity of information due to switching of a CN node. On the other hand, if the communication type is a data communication service, it is determined whether the pool area ID of the source base station is the same as that of the target base station (step S32). If the pool area ID of the source base station is the same as that of the target base station, processing at step S33 is performed, i.e., the CN node is not changed. If the pool area ID is different, processing at step S34 is performed, where a CN node which is closer to the target base station than the CN node with which the source base station has been communicating (or connected to) (generally, a CN node within the pool area to which the target base station belongs) is selected as a node for connection.

As in the first exemplary embodiment, the target base station may be configured to reference a table showing the positional relationship between it and CN nodes which is prepared in each base station when selecting a CN node closest to it (target base station) and/or a CN node. In this case, a CN node is selected at the target base station in accordance with the rules below:
If QoS=Audio (if the QoS is an audio service),
then, target eNode B chooses same CN Node.
If QoS=Data and PA=own PA (if the QoS is data communication and the pool area ID is the same as its own pool area ID),
then, target eNode B chooses same CN Node,
else,
if QoS=DATA and PA≠own PA (if the QoS is data communication and the pool area ID is not the same as its own pool area ID),
then, target eNode B chooses target CN Node.

According to the second exemplary embodiment, by selecting a CN node based on a communication type and a pool area, there can be provided an effect of lessening the influence of information discontinuity due to switching of a CN node on the quality of communication that is sensitive to discontinuity of information, such as audio communication, while presupposing switching of a CN node according to movement of a mobile station.

Which of the CN node selection algorithm of the first exemplary embodiment (FIG. 5) and that of the second exemplary embodiment (FIG. 6) to adopt can depend on the system in question. For example, for a system which puts emphasis on the reduction of influence of information delay resulting from a long communication path on communication quality, the CN node selection algorithm of the first exemplary embodiment may be adopted. For a system which puts emphasis on the reduction of influence of information discontinuity due to CN node switching on communication quality, the CN node selection algorithm of the second exemplary embodiment may be adopted.

As has been described, according to the first or second exemplary embodiment, when the "Handover Request" message contains CN node ID information and pool area ID information, the target base station can use those pieces of information with communication type information to decide an optimum CN node.

The communication types (QoS) in the first and second exemplary embodiments described above are merely examples and are not limited to the ones described: the communication type (QoS) information may also be a guaranteed bit rate, maximum bit rate, delay, error rate, traffic class (e.g., audio, streaming, background, interactive), for example. A CN node selection algorithm appropriately defined to such communication types can be applied to the first and second exemplary embodiments.

It is also possible to define an information set which consists of elements of information on a plurality of communication types (QoS) (e.g., guaranteed bit rate, maximum bit rate, delay, error rate, and traffic class). It is also possible to define a label for indicating a combination of values of elements in such an information set (e.g., combination of guaranteed bit rate=A(bps), maximum bit rate=B(bps) and traffic class=audio). In this case, information on communication type (QoS) may be transmitted as a label (e.g., one-byte information) from a CN node to an eNode B.

The label can also be used as the communication type contained in the "Handover Request" message in the sequence of FIG. 4 which is transmitted from a source base station to a target base station. In this case, the target base station can select an appropriate piece of communication type (QoS) information (element) (e.g., traffic class=audio) from the elements of an information set about communication type (QoS) received as a label, and use the selected communication type information in the CN node selection algorithm.

In such a way, even in a system that has many pieces of communication type (QoS) information, there is provided an effect of allowing a target base station to select an appropriate CN node while suppressing the amount or duration of communication between the source base station and the target base station.

In the exemplary embodiments described above, the target base station receives the communication type of the mobile station, the ID of a CN node with which the source base station is communicating, and a pool area ID to which the source base station belongs, which are information necessary for CN node selection, in the "Handover Request" message S2 (see FIG. 4) from the source base station. On the other hand, in a third exemplary embodiment of the invention, the target base station receives such information (i.e., information for CN node selection) through the "Handover Complete" message S7 shown in FIG. 4 from a mobile station.

Figure 7:
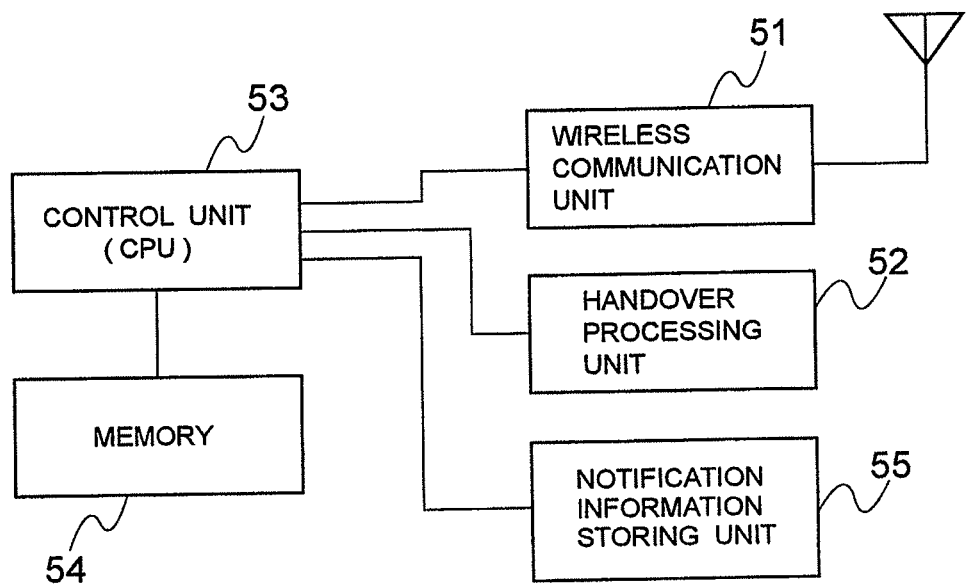
FIG. 7 is a functional block diagram of a mobile station according to a third exemplary embodiment of the invention.

The system configuration and mobile station configuration of the third exemplary embodiment are the same as those shown in FIGS. 1 and 2. FIG. 7 shows the configuration of a mobile station, wherein units corresponding to the ones shown in FIG. 3 are denoted with the same reference numerals as in FIG. 3. As shown in FIG. 7, the mobile station of the third exemplary embodiment has a notification information storing unit 55 for storing notification information for a target base station in addition to the configuration of FIG. 3. The notification information storing unit 55 stores the communication type, the CN node ID with which the source base station is communicating, and the pool area ID of the source base station. The mobile station includes the information stored in the notification information storing unit 55 in the "Handover Complete" message S7 for transmission to the target base station. The target base station receives the information and decides a CN node to which it should connect in accordance with the CN node selection algorithm shown in FIG. 5 or 6.

In the third exemplary embodiment, the mobile station transmits information for CN node selection (communication type, and the ID and the pool area ID of the CN node with which the source base station is communicating) to the target base station in the "Handover Complete" message S7. However, the message used by the mobile station for transmitting the information for CN node selection to the target base station is not limited to the "Handover Complete" message. In a system where a mobile station, not the source base station, requests a handover, for example, the mobile station can also use the "Handover Request", which is a handover request signal, to transmit the information for CN node selection to the target base station.

In the exemplary embodiments described above, the target base station makes determination based on the pool area ID of the source base station (step S32) after determination based on communication type (step S31). However, the target base station can also make determination based on communication type (step S31) after determination based on the pool area ID of the source base station (step S32). In other words, step S31 and step S32 can also be interchanged in FIGS. 5 and 6.

In the exemplary embodiments described above, the target base station selects or decides a CN node with which it will communicate based on the communication type, the ID of the CN node with which the source base station is communicating, and the ID of the pool area to which the source base station belongs. However, the target base station can also decide a node for communication based on the CN node with which the source base station is communicating and the ID of the pool area to which the source base station belongs. In this case, the target base station determines whether the ID of the pool area to which the source base station belongs is the same as its pool area ID without considering the communication type. In other words, step S31 is removed from the CN selection algorithms shown in FIGS. 5 and 6.

This has the effect of allowing the target base station to select a CN node while suppressing the amount of processing performed by the target base station. In addition, the source base station and/or the mobile station may also be configured not to send a communication type to the target base station. This provides the effect of allowing the target base station to select a CN node while suppressing the amount or duration of communication between the source base station or the mobile station and the target base station.

In the exemplary embodiments described above, the target base station decides appropriately a CN node for communication by using the communication type, the ID of the CN node with which the source base station is communicating, and the ID of the pool area to which the source base station belongs. However, it is also possible to arrange the source base station and/or the mobile station to send only the CN node ID to the target base station. In this case, the target base station can also receive the CN node ID from the source base station and/or the mobile station and connect to a CN node which has the CN node ID received.

This provides the effect of allowing the target base station to select a CN node while suppressing the amount or duration of communication between the source base station or the mobile station and the target base station. It also has the effect of enabling the target base station to select a CN node while suppressing the amount of processing to be performed by the target base station.

Further, the source base station and/or the mobile station may also decide a CN node to which the target base station should connect taking into consideration the communication type and/or the pool area ID of CN nodes in advance and send the ID of the CN node decided to the target base station. This provides the effect of enabling the source base station and/or the mobile station to select a CN node to which the target base station should connect.

In addition, when executing the CN node selection algorithm shown in FIG. 5 or 6, the target base station can select a CN node also in consideration of information indicating load on CN nodes. In this case, if the load on a CN node decided or selected for connection is large (i.e., the amount of load is large), the target base station may also select another CN node in its vicinity which is under less load. This provides the effect of allowing the target base station to select an appropriate CN node also in consideration of load distribution among CN nodes in addition to information such as the pool area ID.

It will be apparent that the operation procedure of the base station and/or the mobile station in the exemplary embodiments can be stored as programs in a recording medium such as a ROM, which are read and executed by a computer (CPU).

Further, a fourth exemplary embodiment of the invention is a mobile communication system in which a plurality of base stations and a plurality of core network nodes are distributed in a plurality of areas, wherein a target base station at the time of a handover of a mobile station selects a core network node to which the target base station should connect based on information for selecting a core network node transmitted from a source base station or the mobile station.

A fifth exemplary embodiment of the invention is a mobile communication system in which a plurality of base stations and a plurality of core network nodes are distributed in a plurality of areas, wherein a source base station or a mobile station at the time of a handover of the mobile station transmits information for selecting a core network node to a target base station.

A sixth exemplary embodiment of the invention is a mobile communication system in which a plurality of base stations and a plurality of core network nodes are distributed in a plurality of areas, the mobile communication system comprising:

in a source base station at the time of a handover of a mobile station, a message generating unit for generating a handover request message which includes an identifier of a core network node to which the source base station is connected and an identifier of an area to which the source base station belongs, and a transmitting unit for transmitting the message to a target base station.

A seventh exemplary embodiment of the invention is a mobile communication system in which a plurality of base stations and a plurality of core network nodes are distributed in a plurality of areas, the mobile communication system comprising:

in a mobile station, a message generating unit for generating a handover request message which includes an identifier of a core network node to which a source base station is connected and an identifier of an area to which the source base station belongs, and a transmitting unit for transmitting the message to a target base station at the time of a handover.

A eighth exemplary embodiment of the invention is, in a mobile communication system in which a plurality of base stations and a plurality of core network nodes are distributed in a plurality of areas, a method for selecting a core network node to which a target base station should connect at the time of a handover of a mobile station, comprising:

in a source base station, generating a handover request message which includes an identifier of a core network node to which the source base station is connected and an identifier of an area to which the source base station belongs, and transmitting the message to a target base station.

A ninth exemplary embodiment of the invention is, in a mobile communication system in which a plurality of base stations and a plurality of core network nodes are distributed in a plurality of areas, a method for selecting a core network node to which a target base station should connect at the time of a handover of a mobile station, comprising:

in the mobile station, including an identifier of a core network node to which a source base station is connected and an identifier of an area to which the source base station belongs into a message to a target base station at the time of a handover, and transmitting the message.

A tenth exemplary embodiment of the invention is a source base station at the time of a handover of a mobile station in a mobile communication system in which a plurality of base stations and a plurality of core network nodes are distributed in a plurality of areas, the source base station comprising:

a message generating unit for generating a handover request message which includes an identifier of a core network node to which the source base station is connected and an identifier of an area to which the source base station belongs, and a transmitting unit for transmitting the message to a target base station.

A eleventh exemplary embodiment of the invention is a target base station at the time of a handover of a mobile station in a mobile communication system in which a plurality of base stations and a plurality of core network nodes are distributed in a plurality of areas, the target base station comprising:

a selection unit for selecting a core network node to which the target base station should connect based on an identifier of a core network node to which a source base station is connected and an identifier of an area to which the source base station belongs, which are contained in a handover request message from the source base station.

A twelfth exemplary embodiment of the invention is a target base station at the time of a handover of a mobile station in a mobile communication system in which a plurality of base stations and a plurality of core network nodes are distributed in a plurality of areas, the target base station comprising:

a selection unit for selecting a core network node to which the target base station should connect based on an identifier of a core network node to which a source base station is connected and an identifier of an area to which the source base station belongs, which are contained in a message at the time of the handover from the mobile station.

A thirteenth exemplary embodiment of the invention is a mobile station in a mobile communication system in which a plurality of base stations and a plurality of core network nodes are distributed in a plurality of areas, the mobile station comprising:

a message generating unit for generating a message which includes an identifier of a core network node to which a source base station is connected and an identifier of an area to which the source base station belongs, and a transmitting unit for transmitting the message to a target base station at the time of a handover.

An exemplary advantage according to the invention is that a target base station itself can appropriately select a CN node with which it should communicate by receiving information necessary for selecting a CN node from a source base station or a mobile station at the time of the handover of the mobile station.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A target base station in a mobile communication system comprising a core network node, a source base station, and a mobile station, the target base station comprising:

a communication unit which receives a first identifier from the source base station when the mobile station performs handover to the target base station from the source base station; and a wireless communication unit which establishes a communication connection with the mobile station;

wherein the first identifier identifies the core network node to which the source base station is connected, the core network node being able to be connected with, at least, one of base stations in the mobile communication system by a S1 interface, and wherein the first identifier identifies the core network node which can receive a message related to Path Switch.

2. The target base station according to claim 1, wherein the source base station and the target base station are e Node Bs.

3. The target base station according to claim 1, wherein a handover request which includes the first identifier is transmitted from the source base station to the target base station.

4. A mobile communication system comprising a core network node, a source base station, a target base station, and a mobile station, wherein the mobile station performs handover to the target base station from the source base station;

the source base station transmits a first identifier to the target base station during the handover;

the target base station receives the first identifier; and the mobile station establishes a communication connection with the target base station;

wherein the first identifier identifies the core network node to which the source base station is connected, the core network node being able to be connected with, at least, one of base stations in the mobile communication system by a S1 interface, and wherein the first identifier identifies the core network node which can receive a message related to Path Switch.

5. The mobile communication system according to claim 4, wherein the source base station and the target base station are e Node-Bs.

6. The mobile communication system according to claim 4, wherein a handover request which includes the first identifier is transmitted from the source base station to the target base station.

7. A method for a mobile communication system comprising a core network node, a source base station, a target base station, and a mobile station, the method comprising;
   performing wireless communication between the source base station and the target base station;
   performing handover to the target base station from the source base station by the mobile station;
   transmitting a first identifier to the target base station from the source base station during the handover; and
   establishing a communication connection between the mobile station and the target base station;
   wherein the first identifier identifies the core network node to which the source base station is connected, the core network node being able to be connected with, at least, one of base stations in the mobile communication system by a S1 interface, and
   wherein the first identifier identifies the core network node which can receive a message related to Path Switch.

8. The method according to claim 7, wherein the source base station and the target base station are e Node-Bs.

9. The method according to claim 7, wherein a handover request which includes the first identifier is transmitted from the source base station to the target base station.

10. A mobile station in a mobile communication system comprising a core network node, a source base station, and a target base station, the mobile station comprising:
   a wireless communication unit which performs wireless communication with the source base station;
   a handover processing unit which performs handover from the source base station to the target base station;
   a communication unit which establishes a communication connection with the target base station which received a first identifier from the source base station in the handover procedure,
   wherein the first identifier identifies the core network node to which the source base station is connected, the core network node being able to be connected with, at least, one of base stations in the mobile communication system by a S1 interface, and
   wherein the first identifier identifies the core network node which can receive a message related to Path Switch.

11. The mobile station according to claim 10, wherein a handover request which includes the first identifier is transmitted from the source base station to the target base station.

* * * * *